(12) United States Patent
Lin et al.

(10) Patent No.: US 7,710,518 B2
(45) Date of Patent: May 4, 2010

(54) SYSTEM FOR DISPLAYING IMAGES

(75) Inventors: Hsiao-Yi Lin, Hsinchu (TW); Hsiang-Ju Chuang, Hsinchu (TW); I-Chun Lai, Taiping (TW); Szu-Hui Chen, Huamei Village (TW); Ya-Chuan Tsai, Luodong Township, Yilan County (TW); Chi-Huang Lin, Yongkang (TW)

(73) Assignee: TPO Displays Corp., Miao-Li Country (TW)

( * ) Notice: Subject to any disclaimer, the term of this patent is extended or adjusted under 35 U.S.C. 154(b) by 391 days.

(21) Appl. No.: 11/565,747

(22) Filed: Dec. 1, 2006

(65) Prior Publication Data

US 2008/0129937 A1 Jun. 5, 2008

(51) Int. Cl.
*G02F 1/1333* (2006.01)
*G02F 1/1339* (2006.01)

(52) U.S. Cl. .................. 349/110; 349/155; 349/156

(58) Field of Classification Search .................. None
See application file for complete search history.

(56) References Cited

U.S. PATENT DOCUMENTS

| 6,862,050 B2 * | 3/2005 | Rho et al. ............... 349/44 |
| 2006/0238694 A1 * | 10/2006 | Chen et al. ............... 349/156 |
| 2007/0064178 A1 * | 3/2007 | Murai ............... 349/108 |

* cited by examiner

*Primary Examiner*—Tina M Wong
(74) *Attorney, Agent, or Firm*—Thomas, Kayden, Horstemeyer & Risley

(57) ABSTRACT

A system for displaying images is disclosed. A display device comprises a first substrate comprising a plurality of pixels, each comprising RGB transparent sub-pixel regions. A second substrate comprises RGB regions opposite the first substrate, wherein the transparent sub-pixel regions respectively correspond to the three major color regions. A light blocking layer is disposed in one of the transparent sub-pixel regions of the first substrate. A photo spacer corresponding to the light blocking layer is formed, supporting the opposite first and second substrates.

18 Claims, 7 Drawing Sheets

SYSTEM FOR DISPLAYING IMAGES

BACKGROUND OF THE INVENTION

1. Field of the Invention

The invention relates to a display device, and more particularly to a liquid crystal display device with increased aperture ratio.

2. Description of the Related Art

Liquid crystal displays (LCD) are widely used, operating via alignment of liquid crystal molecules changed by application of an electrical field, altering the path of light therethrough. Typically, an LCD includes two opposite substrates with a gap therebetween occupied by liquid crystal. Both substrates are formed with electrodes to control orientation and arrangement of the liquid crystals, according to which images are displayed on the LCD panel in which bright or dark dots are generated where light passes or is blocked.

FIG. 1 is a cross section of a conventional liquid crystal panel 100 comprising an array substrate 102, a color filter substrate 104 and liquid crystals 106 therebetween. Typically, ball spacers 108 separate the substrates to allow injection of liquid crystals 106. Ball spacers 108, however, generate light leakage and shift and lower mechanical strength.

Consequently, photo spacers are currently widely used, while still blockage to avoid light leakage. Therefore, it is beneficial to develop a display device with photo spacers without light leakage, and color shift.

BRIEF SUMMARY OF THE INVENTION

A detailed description is given in the following embodiments with reference to the accompanying drawings. These and other problems are generally solved or circumvented, and technical advantages are generally achieved, by preferred illustrative embodiments of the invention, which provide a display device.

Systems for displaying images are provided. In this regard, an exemplary embodiment of such as system comprises a display device, comprising a first substrate comprising a plurality of pixels, each comprising RGB transparent sub-pixel regions. A second substrate comprises RGB color regions opposite the first substrate, wherein the RGB transparent sub-pixel regions respectively correspond to the RGB color regions. An opaque light blocking layer is disposed in at least one of the RGB transparent sub-pixel regions of the first substrate. A photo spacer corresponds to the opaque light blocking layer, supporting the opposite first and second substrates.

Another system for displaying images is also provided, in which a display device comprises a first substrate comprising a plurality of pixels, each comprising RGB transparent sub-pixel regions. A second substrate comprises RGB color regions opposite the first substrate, wherein the RGB sub-pixel regions respectively correspond to the RGB color regions. An opaque light blocking layer is disposed in one of the transparent sub-pixel regions of the first substrate. A photo spacer corresponding to the light blocking layer is formed, supporting the opposite first and second substrates, wherein the size of transparent sub-pixel region with the light blocking layer exceeds that of transparent sub-pixel region without the light blocking layer.

In another exemplary embodiment, the display device comprises a first substrate comprising a plurality of pixels, each comprising RGB transparent sub-pixel regions. A second substrate comprises RGB color regions opposite the first substrate, wherein the RGB sub-pixel regions respectively correspond to the RGB color regions. An opaque light blocking layer is disposed in one of the transparent sub-pixel regions of the first substrate. A photo spacer corresponds to the opaque light blocking layer, supporting the opposite first and second substrates, wherein the pixel array comprises at least one R transparent sub-pixel region with the light blocking layer, at least one G transparent sub-pixel region with the light blocking layer, and at least one B transparent sub-pixel region with the light blocking layer.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
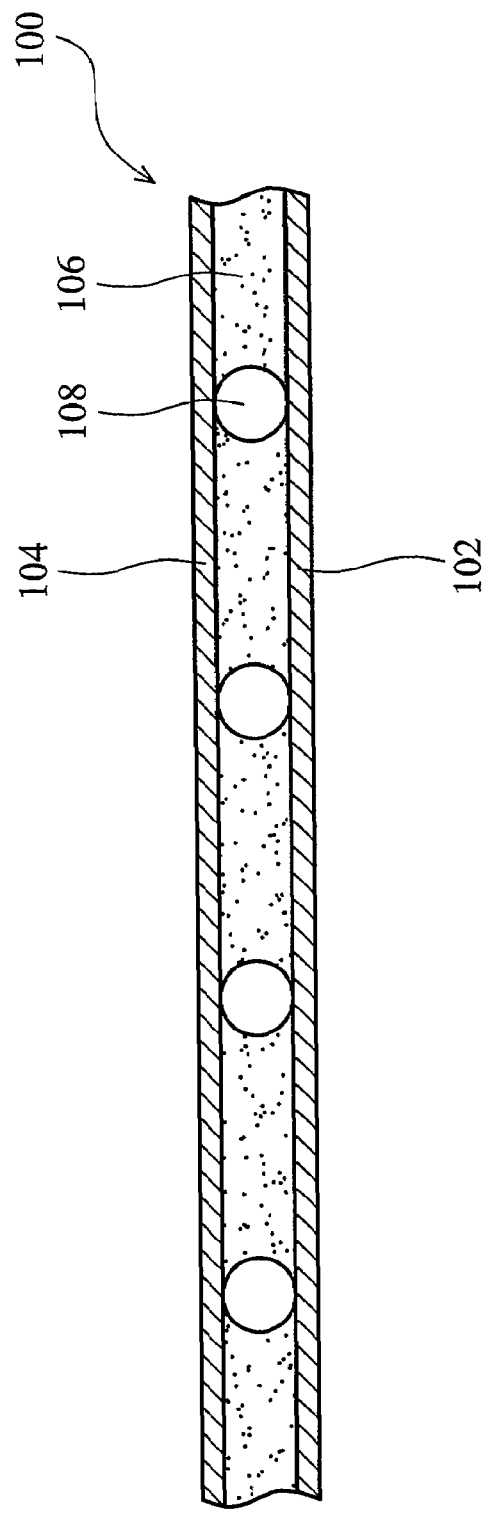
FIG. 1 is a cross section of a conventional liquid crystal panel.

The following description is of the best-contemplated mode of carrying out the invention. This description is made for the purpose of illustrating the general principles of the invention and should not be taken in a limiting sense. The scope of the invention is best determined by reference to the appended claims. Embodiments of the invention, which provides a liquid crystal display device, will be described in greater detail by referring to the drawings that accompany the invention. It is noted that in the accompanying drawings, like and/or corresponding elements are referred to by like reference numerals.

Figure 2:
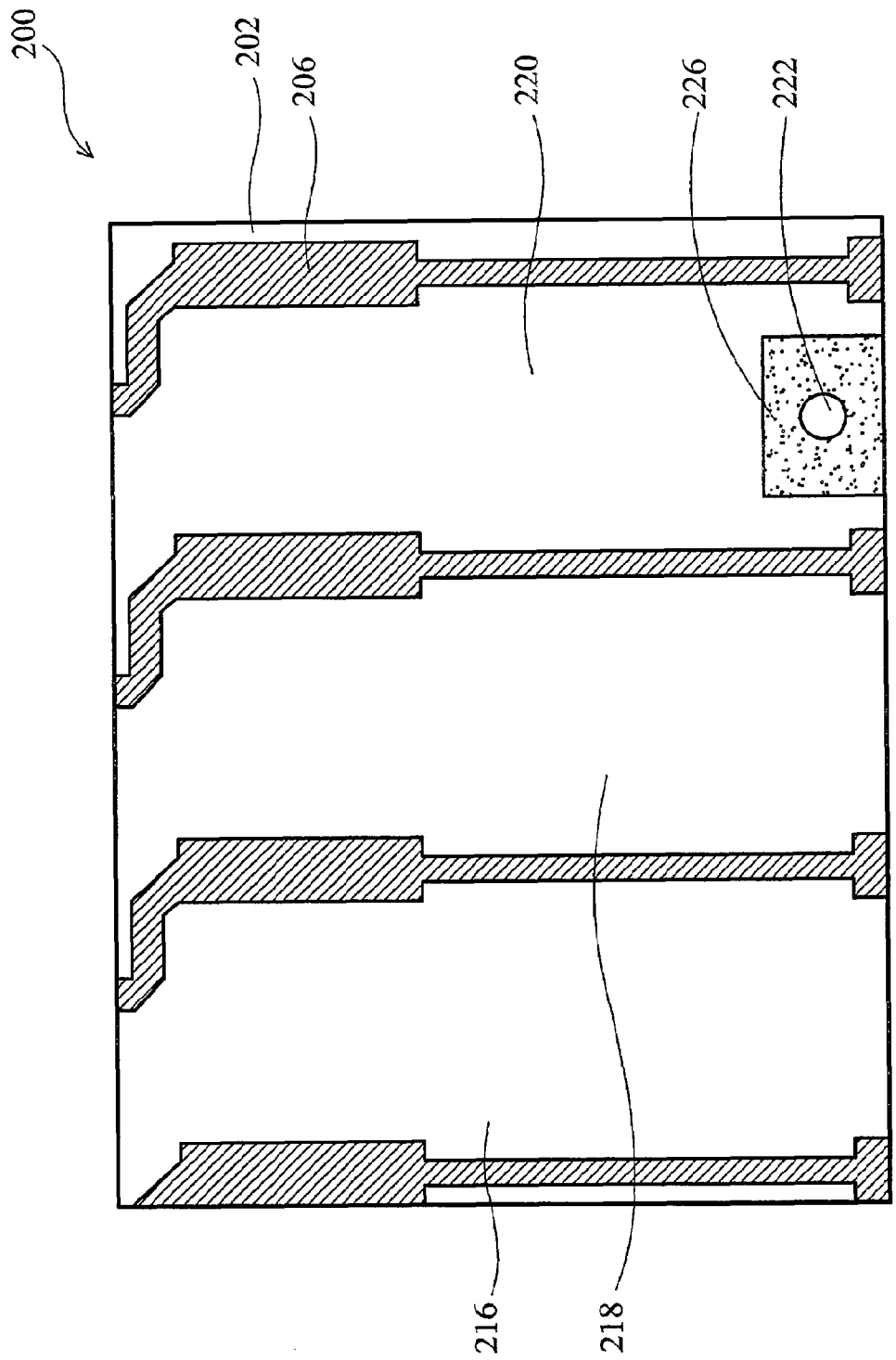
FIG. 2 is a plan view of a system for displaying images of an embodiment of the invention.

FIG. 2 is a schematic plan view of a system for displaying images, comprising a display device 200 of an embodiment of the invention. Referring to FIG. 2, the liquid crystal display device 200 comprises a plurality of pixels comprising sub-pixels, such as red sub-pixel 216, green sub-pixel 218 and blue sub-pixel 220, formed on a substrate. Each sub-pixel, disposed between two adjacent data lines 206, has a thin-film transistor (not shown), and a storage capacitor (not shown). Further, each red, green, and blue (RGB) sub-pixel corresponds to a red, green, and blue color filter formed on a substrate (also called a second substrate). As a main feature and a key aspect, at least one sub-pixel of the pixel (such blue sub-pixel 220 shown in FIG. 2) comprises a light blocking layer 226 and a spacer 222 formed within the area of the light blocking layer 226. Suitable material for the spacer can be photoresist.

Figure 3:
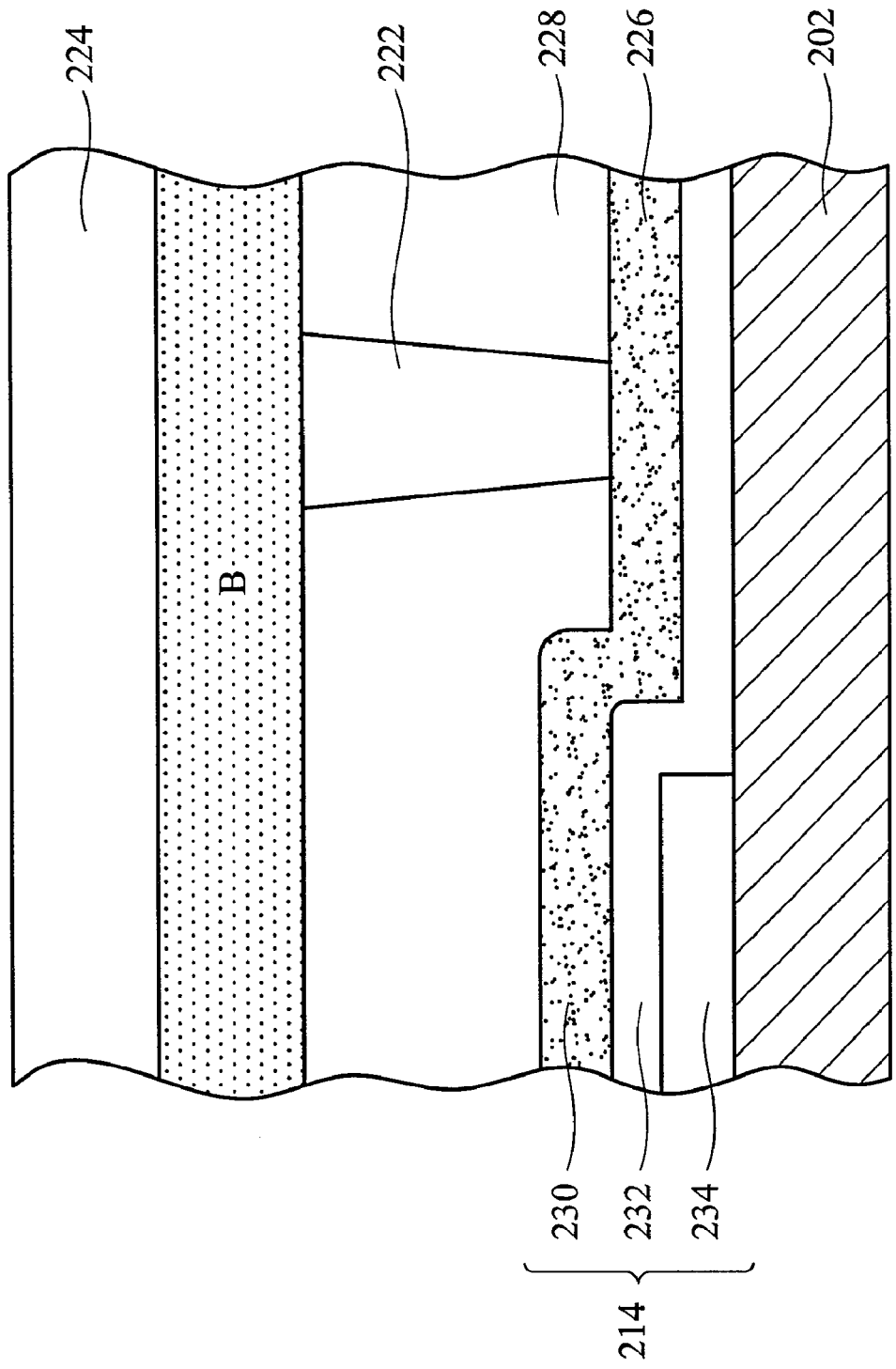
FIG. 3 is a cross section showing the location relationship between the capacitor, the blocking layer, and the spacer of an embodiment of the invention.

Referring to FIG. 3, in some embodiments of the invention, the color filter substrate (second substrate) 224 corresponding to the spacer 222 does not comprise the light blocking layer 226, the spacer 222 of the blue sub-pixel 220 is formed between a blue color filter B and the light blocking layer 226 and supports the first 202 and second substrates 224 for injection of liquid crystals 228, and the photo spacer 222 can be blocked by the light blocking layer 226 to avoid light leakage. In an embodiment of the invention, the storage capacitor 214 is formed in the blue sub-pixel 220 comprising a semiconductor layer 234 formed on the substrate 202, a gate insulating layer 232, and a first metal layer 230. Particularly, the first metal layer 230 and the light blocking layer 226 can be formed by the same process and made by the same material. Namely, the spacer 222 can be formed on the extended first metal layer 230 serving as the blocking layer 226. In an embodiment of the invention, a second metal layer (the data line 206) can also serve as the light blocking layer, forming above the spacer 222. Preferably, the light blocking layer 226 is opaque material and can comprise metal material or alloy thereof, such as Mo, Al or combinations thereof or stacked layers thereof.

In the embodiment, since the light blocking layer 226 blocking the photo spacer 222 occupies some area of the sub-pixel 220, the aperture ratio thereof is reduced. Thus, the aperture of the sub-pixel 220 comprising the light blocking layer 226 is less than the aperture of the sub-pixels 216 and 218 without the light blocking layer. For example, referring to FIG. 2, the pixel areas of the red sub-pixel 216 and the green sub-pixel 218 without the light blocking layer 226, being pervious to light, are larger than that of the blue sub-pixel 220 with the light blocking layer 226 respectively. Thus, the aperture ratio of the red sub-pixel 216 and the green sub-pixel 218 is respectively larger than the aperture ratio of the blue sub-pixel 220 and may cause color shift issues. A further V-T curve adjustment method can be adapted to solve the color shift issues.

In some embodiments of the invention, the sub-pixels with the light blocking layer and the sub-pixels without the light blocking layer can have different sub-pixel sizes to maintain substantially the same aperture ratio. Particularly, the size of sub-pixel with the light blocking layer can be larger than that of transparent sub-pixel region without the light blocking layer.

Figure 4:
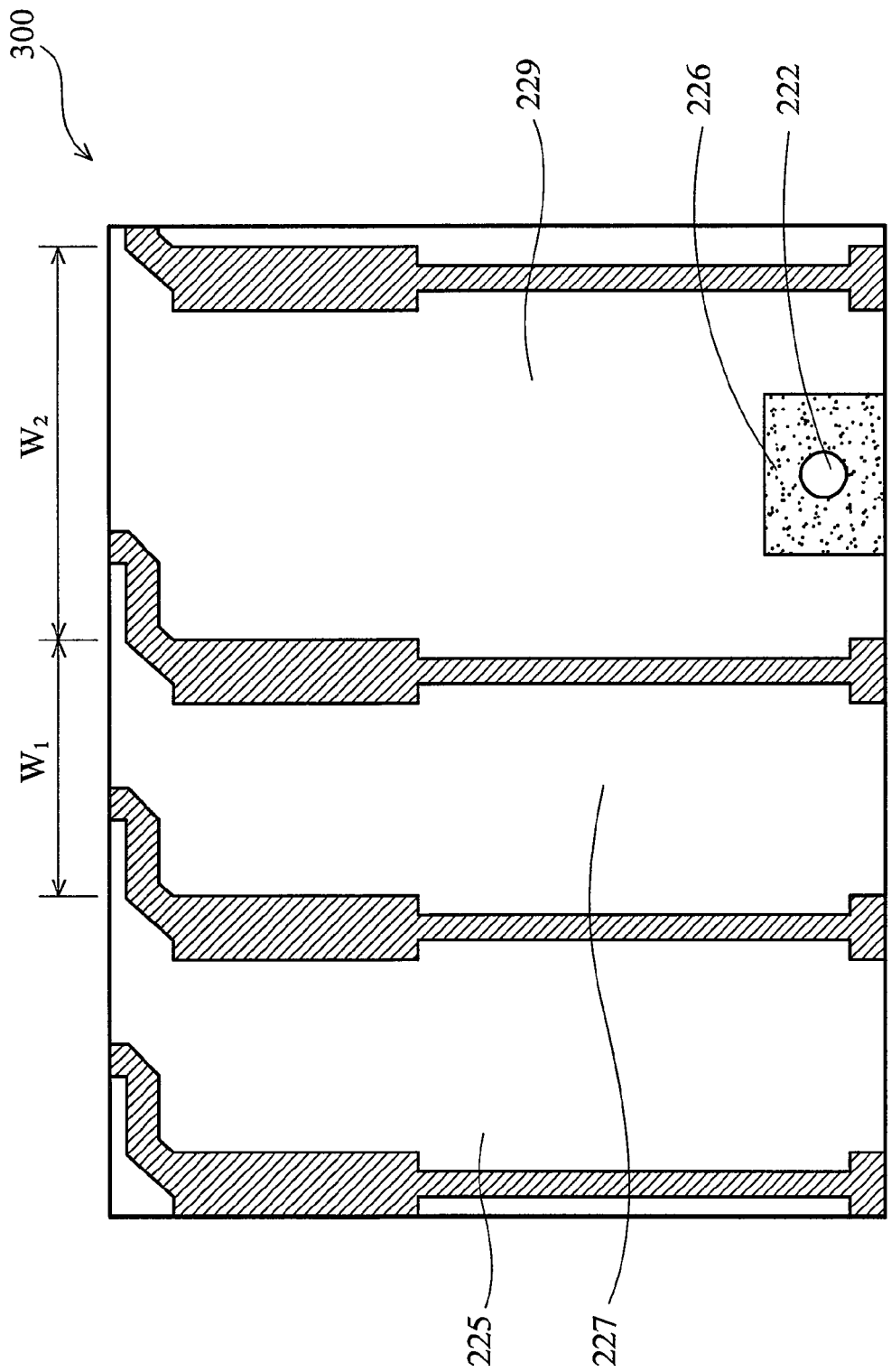
FIG. 4 is a plan view of a system for displaying images of another embodiment of the invention.

FIG. 4 is a plan view of a system for displaying images, such as a display device 300, of another embodiment of the invention. In FIG. 4, the size of the sub-pixel 229 with the light blocking layer 226 is increased and the size of the sub-pixels 225 and 227 without the light blocking layer 226 is reduced to balance the pixel areas of the three major colors being pervious to light. For example, in FIG. 4, since the blue sub-pixel 229 has larger sub-pixel area, the transparent area of the blue sub-pixel 229 not occupied by the light blocking layer 226 is substantially equal to the transparent areas of the red sub-pixel 225 and the green sub-pixel 227 respectively. Consequently, the sub-pixel 229 with the light blocking layer and the sub-pixel 225 and 227 without the light blocking layer have substantially the same aperture ratio to avoid color shift, and the average aperture ratio can be increased. Herein, the light blocking layer is disposed in one of the RGB sub-pixels.

Figure 5:
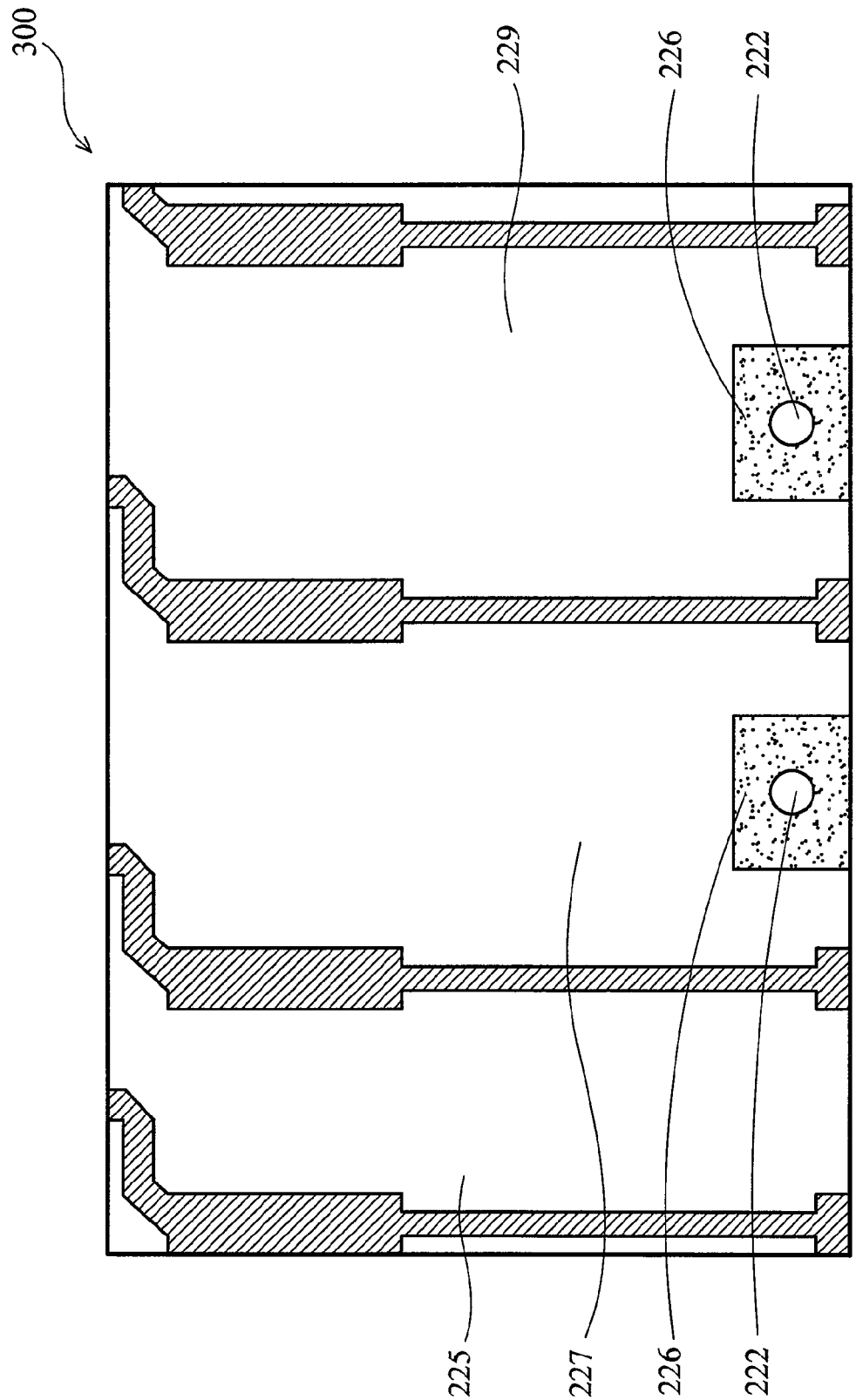
FIG. 5 is a schematic plan view of a system for displaying images of still another embodiment of the invention.

According to another embodiment of the invention, referring to FIG. 5, two RGB transparent sub-pixels (such as green sub-pixel 227 and blue sub-pixel 229) can simultaneously have the light blocking layer 226 and spacer 222. Similarly, the green sub-pixel 227 and blue sub-pixel 229 (with the light blocking layer) can be larger than that of red sub-pixel 225 (without the light blocking layer), thus the RGB sub-pixels 225, 227, and 229 have substantially the same aperture ratio to avoid color shift.

According to embodiments described, the photo spacer 222 supporting the corresponding sub-pixel can be blocked by a light blocking layer 226 disposed therein for a small-dimension display panel without black matrix. Therefore, light leakage of the photo spacer is eliminated. In addition, since the size of sub-pixel 229 with the light blocking layer 226 can be larger than that of transparent sub-pixel 225 and 227 region without the light blocking layer 226 to balance the pixel areas of the three major colors being pervious to light, the color shift issues are also eliminated. In addition, average aperture ratio is increased.

Figure 6:
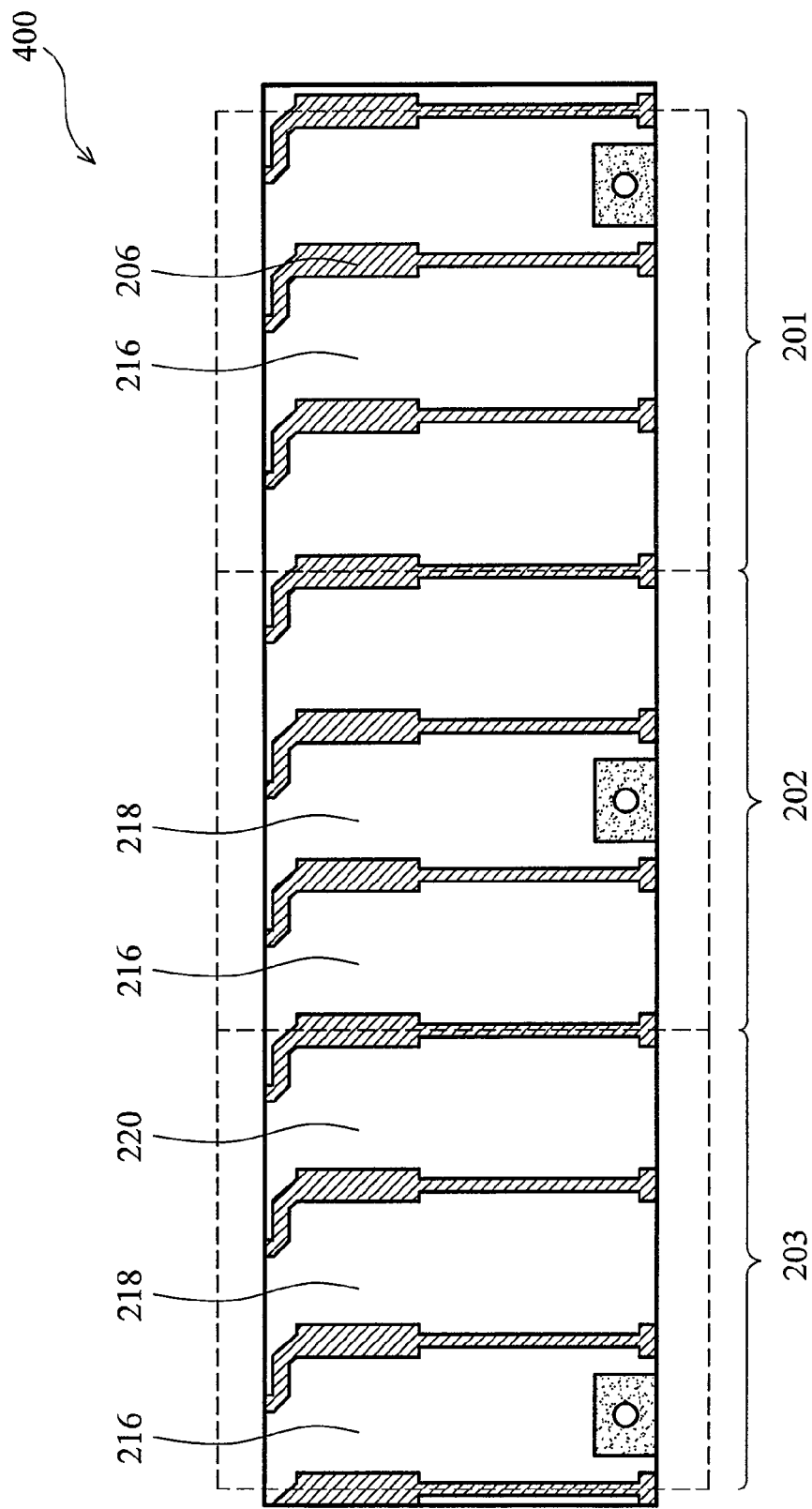
FIG. 6 is a schematic plan view of a system for displaying images of yet another embodiment of the invention.

In still another embodiment of the invention, the display device further comprises a pixel array structure constructed by three adjacent pixels. As shown in FIG. 6, the pixel array structure 400 comprises three adjacent pixels 201, 202, and 203 arranged in an array. Specifically, the pixel array structure 400 has the same amount of red, green, and blue sub-pixels (In FIG. 6, the amount of red, green, and blue sub-pixels within the pixel array structure 400 are three). As a main feature and a key aspect, the amount of red, green, and blue sub-pixels 216, 218, and 220 with light blocking layer 226 within the pixel array structure 400 can be the same.

In the pixel array structures 400, since all the sub-pixels are the same size and the size of light blocking layers formed respectively in all red sub-pixels 216, all green sub-pixels 218, and all blue sub-pixels 220 are the same, the total aperture ratio of red sub-pixels 216, all green sub-pixels 218, and all blue sub-pixels 220 are substantially the same, preventing the display device from color shift and improving white yellowish issue. Further, since each sub-pixel has the same size, fabricating complexity of the display device is simplified and yield increased. Accordingly, the display device with the pixel array structures 400 exhibits increased aperture ratio and good color performance, suitable for serving small-size transmissive type liquid crystal device.

Figure 7:
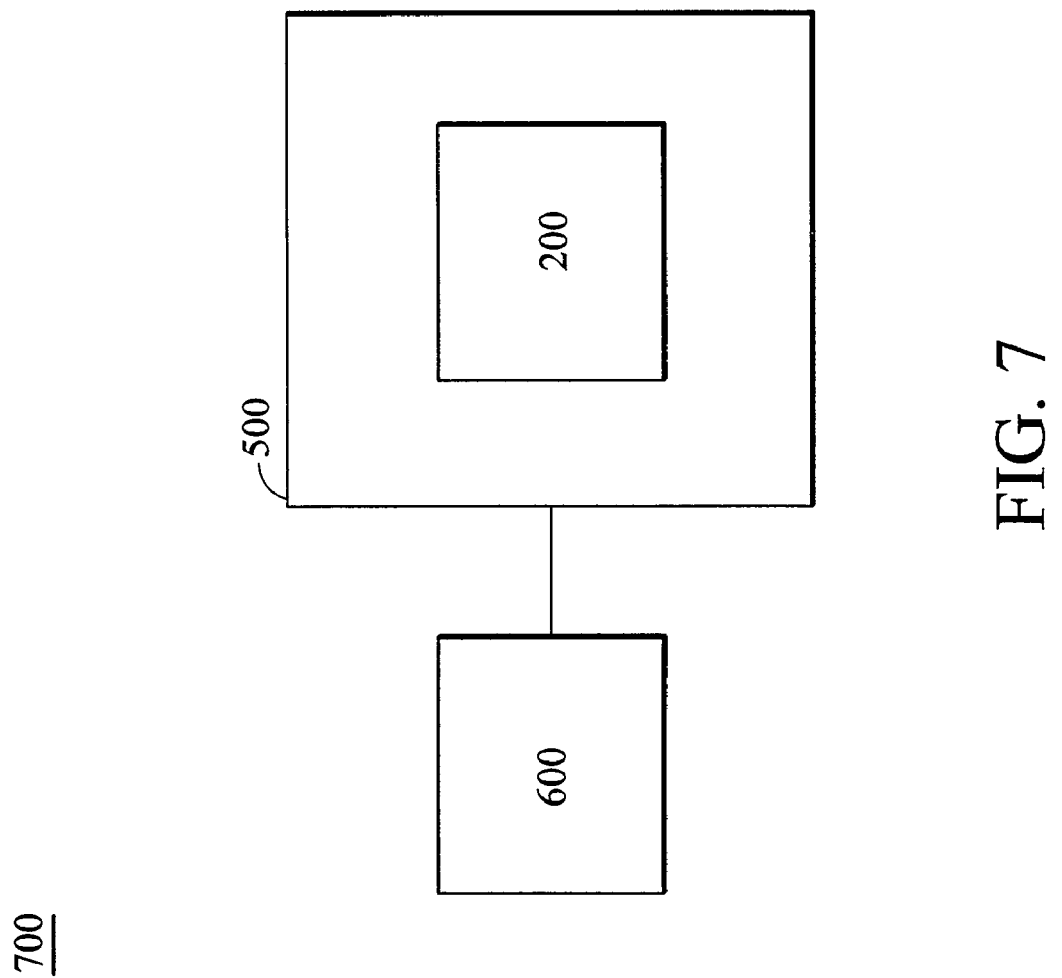
FIG. 7 schematically shows another embodiment of a system for displaying images.

FIG. 7 schematically shows another embodiment of a system for displaying images which, in this case, is implemented as a display panel 500 or an electronic device 700. The display device can be incorporated into a display panel. As shown in FIG. 4, the display panel 500 comprises a display device, such as the liquid crystal display device 200 shown in FIG. 2 or the liquid crystal display device 300 shown in FIG. 4. The display panel 500 is applicable in a variety of electronic devices (in this case, electronic device 700).

Generally, the electronic device 700 can comprise the display panel 500 and an input unit 600. Further, the input unit 600 is operatively coupled to the display panel 500 and provides input signals (e.g., an image signal) to the display panel 500 to generate images. The electronic device 700 can be a mobile phone, digital camera, PDA (personal data assistant), notebook computer, desktop computer, television, car display, or portable DVD player, for example.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
 a display device, comprising:
 a first substrate comprising a plurality of pixels, each pixel comprising RGB transparent sub-pixel regions;
 a second substrate comprising RGB color regions opposite the first substrate, wherein the RGB transparent sub-pixel regions, respectively correspond to the RGB color regions;
 a light blocking layer disposed on at least one of the transparent sub-pixel regions of the first substrate, wherein the transparent sub-pixel region with the light blocking layer is larger than the transparent sub-pixel region without the light blocking layer; and a photo spacer disposed between the light blocking layer and the second substrate.

2. The system as claimed in claim 1, wherein the photo spacer comprises photoresist.

3. The system as claimed in claim 1, wherein the display device further comprises a storage capacitor comprising a semiconductor layer on the first substrate, a gate insulator layer on the semiconductor layer and a first metal layer on the gate insulating layer, and the light blocking layer and the first metal layer are formed by the same process and the same material.

4. The system as claimed in claim 1, wherein the display device further comprises a second metal layer serving as data lines, and the light blocking layer and the second metal layer are formed by the same process and the same material.

5. The system as claimed in claim 1, wherein the second substrate corresponding to the spacer does not comprise the light blocking layer.

6. The system as claimed in claim 1, wherein the light blocking layer comprises an opaque material.

7. The system as claimed in claim 1, wherein each RGB transparent sub-pixel region has substantially the same aperture ratio.

8. The system as claimed in claim 1, further comprising a pixel array comprising three adjacent pixels, wherein the pixel array comprises at least one R transparent sub-pixel region with the light blocking layer, at least one G transparent sub-pixel region with the light blocking layer, and at least one B transparent sub-pixel region with the light blocking layer.

9. The system as claimed in claim 8, wherein, in the pixel array, the light blocking layers within R transparent sub-pixel regions, the light blocking layers within G transparent sub-pixel regions, and the light blocking layers within R transparent sub-pixel regions are the same size.

10. The system as claimed in claim 9, wherein, in the pixel array, the total aperture ratio of R transparent sub-pixel regions, G transparent sub-pixel regions, and B transparent sub-pixel regions are the same.

11. The system as claimed in claim 1, further comprising a display panel, wherein the display device forms a portion of the display panel.

12. The system as claimed in claim 1, further comprising an electronic device, wherein the electronic device comprises:
the display panel; and
an input unit coupled to the display panel and operative to provide input to the display panel such that the display panel displays images.

13. A system for displaying images, comprising:
a display device, comprising:
a first substrate comprising a plurality of pixels, each pixel comprising RGB transparent sub-pixel regions;
a second substrate comprising RGB regions opposite the first substrate, wherein the RGB sub-pixel regions respectively correspond the RGB color regions;
a light blocking layer disposed on at least one of the RGB transparent sub-pixel regions of the first substrate; and
a photo spacer disposed between the light blocking layer and the second substrate,
wherein the size of transparent sub-pixel region with the light blocking layer exceeds that of transparent sub-pixel region without the light blocking layer.

14. The system as claimed in claim 13, wherein the transparent sub-pixel region comprising the light blocking layer has substantially the same aperture ratio as the transparent sub-pixel region without the light blocking layer.

15. The system as claimed in claim 13, wherein, in a pixel, the light blocking layer is disposed in one of the RGB transparent sub-pixel regions.

16. The system as claimed in claim 13, wherein, in a pixel, the light blocking layer is disposed in two of the RGB transparent sub-pixel regions.

17. A system for displaying images, comprising:
a display device, comprising:
a first substrate comprising a plurality of pixels, each pixel comprising RGB transparent sub-pixel regions, wherein each three adjacent pixels comprise a pixel array;
a second substrate comprising RGB regions opposite the first substrate, wherein the RGB sub-pixel regions respectively correspond to the RGB color regions;
a light blocking layer disposed on at least one of the RGB transparent sub-pixel regions of the first substrate; and
a photo spacer disposed between the light blocking layer and the second substrate,
wherein the pixel array comprises at least one R transparent sub-pixel region with the light blocking layer, at least one G transparent sub-pixel region with the light blocking layer, and at least one B transparent sub-pixel region with the light blocking layer, wherein the transparent sub-pixel region with the light blocking layer is larger than the transparent sub-pixel region without the light blocking layer.

18. The system as claimed in claim 17, wherein, in the pixel array, the light blocking layers within R transparent sub-pixel regions, the light blocking layers within G transparent sub-pixel regions, and the light blocking layers within R transparent sub-pixel regions are the same size.

* * * * *